Aug. 21, 1951   J. VAN TASSEL   2,564,866
FENCE
Filed Jan. 21, 1949
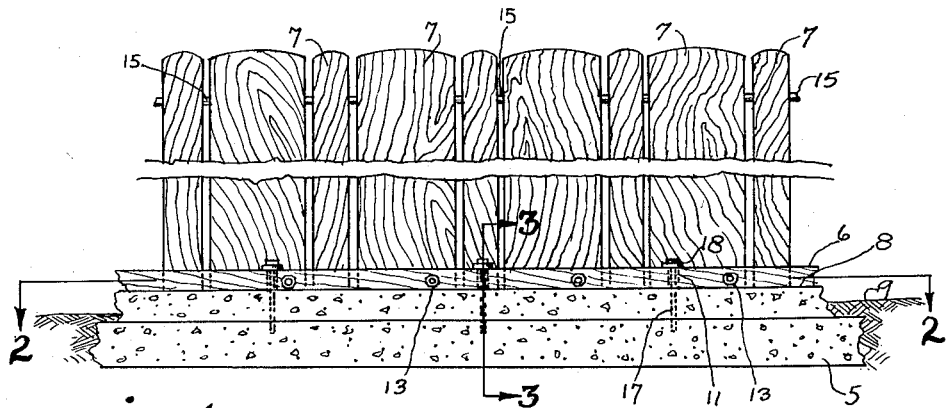
Fig. 1
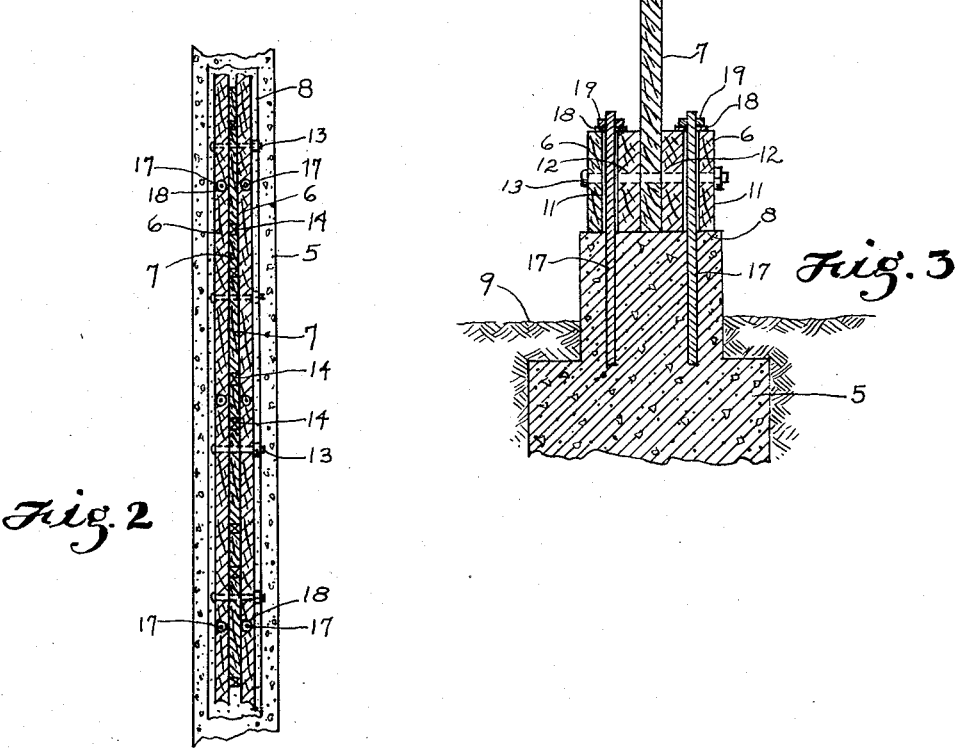
Fig. 2
Fig. 3
INVENTOR.
James Van Tassel
BY
Stedman B. Hoar
Agent Patented Aug. 21, 1951

2,564,866

UNITED STATES PATENT OFFICE 2,564,866

FENCE

James Van Tassel, Santa Ana, Calif.

Application January 21, 1949, Serial No. 71,939

4 Claims. (Cl. 256—19)

This invention relates to a fence and has as an object the provision of a fence which is attractive in appearance, effective as a barrier, and low in cost.

A further object of the invention is to provide a fence largely and visibly of wooden construction but having termite-proof footings.

Still another object of the invention is to provide a fence having a continuous buried footing discouraging to burrowing animals and an upper portion which may be more or less open according to the wishes of the owner.

It is another object of the invention to provide a fence having a permanent footing and easily replaceable upper portions.

The invention has numerous other advantages and objects which will be pointed out in the following description of a preferred embodiment of the invention, or will be readily apparent from consideration of the description, taken in connection with the accompanying drawing, in which:

Fig. 1 is an elevational view of a fence embodying the principles of the present invention;

Fig. 2 is a horizontal sectional view taken on the line 2—2 of Fig. 1, and looking downward toward the footing of the fence; and Fig. 3 is an enlarged fragmentary vertical sectional view taken on the line 3—3 of Fig. 1.

Referring now to the details of the drawing, my improved fence comprises a footing 5, upon which are layed stringers 6 arranged to clamp between them the lower ends of upright barrier-forming members 7. The footing 5 is preferably of cementitious material, such as concrete, which may suitably be embedded in the ground without injury, and has its upper surface 8 preferably raised above the ground level, indicated at 9. The stringers 6 and the upright members 7, being thus raised from the ground, may suitably be of wood, although they may be of metal, and a fence of great durability may be constructed by making the upright members 7 in the form of concrete slabs.

The upright members 7 may have the form of simple pickets, or of slabs, or of an ornamental combination of narrow and wide members, as illustrated in Fig. 1, it being understood that they differ from ordinary fence posts in that they are capable of forming the required barrier or screen without intervening wire or rails or other barrier material, although they may be held spaced apart.

The stringers 6 are provided at suitable intervals with vertical holes 11 and also with horizontal holes 12. Bolts 13, which pass through the horizontal holes 12, connect the stringers 6 disposed on opposite sides of the members 7 and serve to clamp the members 7 tightly between the stringers. The bolts 13 may pass through holes suitably provided in the upright members 7 or may pass between adjacent members 7 as may be found convenient. If the members 7 are to be spaced apart approximately the thickness of the bolts 13, the bolts may appropriately serve as spacers; otherwise, spacers 14, shown in Fig. 2 may be placed between the members 7. Adjacent to their upper ends, the members 7 may be interconnected by dowels 15, to preserve both their spacing and their alignment. Other suitable aligning means may also be used, but I prefer readily separable inter-locks such as dowels, as their use facilitates the erection and the dismantling of the fence.

Studs 17 are set in the footing 5 at intervals corresponding to the spacing of the vertical holes 11. The holes 11 are over-size for the studs 17, which extend therethrough to permit limited movement of opposite and parallel stringers 6 towards and away from each other as is necessary in clamping the stringers upon the members 7. The over-size holes 11 also facilitate alignment of the upper portion of the fence upon the footing 5. Because of the over-size of the holes 11, washers 18 as well as nuts 19 are preferably provided for the studs 17.

To set up a fence in accordance with the present invention, the footing 5 is first poured in the ground, with its upper surface 8 at or above ground level, and the studs 17 are set in the footing at suitable longitudinal and transverse intervals, extending above the surface 8 in suitable accordance with the thickness of the stringers 6 which are to be used. When the footing has hardened, the stringers 6 are placed thereon and the over-size vertical holes 11 are bored in the stringers to correspond with the studs 17. The stringers are then put in place with the studs 17 extending through the holes 11, but the nuts 19 are left untightened.

The upright members 7 are then successively placed with their lower ends between the stringers 6, with spacers 14 and dowels 15 or other interlocking means being used as required. The bolts 13 are inserted in the horizontal holes 12, passing either between the members 7 or through holes bored therein as the work progresses. When a section of fence has been set up corresponding to the length of a pair of opposed stringers, the bolts 13 are tightened to clamp the upright members firmly between the stringers. The nuts 19 are then tightened on the studs 17 to clamp the upper portion of the fence to the footing 5. If the over-size holes 11 have been bored reasonably concentrically with the studs 17, the fence will be perfectly aligned with little or no lateral strain upon the stringers or studs.

It will be apparent that my invention permits the rapid extension of a fence along a previously prepared concrete footing with all the facility with which an ordinary picket or slat fence may be extended on fence posts set in soft ground, and that the usual difficulties of alignment, and of stresses and splitting caused by misalignment with a rigid base, have been obviated by the feature of having the upright members 7 merely clamped between the stringers 6, and the stringers 6 adjustable relatively to the concrete footing 5 so as to be securable thereto without lateral strain. The common causes of splitting and of warping of wooden fences are differences in shrinkage and expansion due to seasoning and to absorption of moisture; such differences are of little or no importance in a fence constructed in accordance with my invention, and green lumber may be used for the merely clamped members 7 without fear of consequences.

If, later, it is desired to remove or replace one or more of the upright members 7, it is only necessary to loosen the bolt or bolts 13 passing through the particular member or in its immediate vicinity, lift out the adjacent spacers 14, slide the upright member to one side and then the other to clear the dowels 15, and lift the upright member from the stringers—an operation not requiring the drawing of screws or nails but only the use of a wrench and therefore accomplished without marring the adjacent portions of the fence.

It will be seen that my improved fence is not only simple to construct and to repair, but lends itself to a variety of useful and ornamental forms, varying from a continuous closed structure to a relatively open structure, in which the wooden parts are protected from ground-rot and the footing provides a large measure of discouragement to burrowing animals.

I claim:

1. A fence comprising: a concrete footing, parallel stringers extending lengthwise of said footing and secured thereto so as to be movable towards and away from each other; upright members having their lower ends disposed between said stringers; and bolts extending through said stringers for clamping said stringers upon said lower ends of said upright members.

2. A fence comprising: a concrete footing; parallel stringers extending lengthwise of said footing and secured thereto so as to be movable towards and away from each other; upright members having their lower ends disposed between said stringers; means for moving said stringers into clamping engagement with said lower ends of said upright members; and dowels interconnecting the upper ends of said upright members so as to hold said upper ends in alignment and to permit separation of said upright members when the lower ends thereof are released from said stringers.

3. A fence comprising: a plurality of upright members adapted when closely disposed in alignment to form a barrier; elongated horizontal members disposed contiguously to the lower ends of said upright members on opposite sides thereof for holding said lower ends in alignment, and having spaced vertical holes; means for removably clamping said upright members between said horizontal members; means interconnecting the upper ends of said upright members for holding said upper ends in alignment; a footing of cementitious material supporting said upright members and said horizontal members above the ground level; and releasable fastening means set in said footing and extending through the vertical holes of said horizontal members, said fastening means engaging said holes loosely to permit limited lateral movement of said horizontal members when said fastening means are released.

4. A fence comprising: a plurality of wooden members having the nature of pickets; a footing of cementitious material for supporting said wooden members above the ground level; stringers disposed on opposite sides of the lower ends of said wooden members and having spaced horizontal and vertical holes; clamping means extending through said horizontal holes for clamping said stringers to said wooden members to hold the latter upright and in alignment; and additional clamping means set in said footing and extending through said vertical holes for clamping said stringers to said footing, said additional clamping means fitting said vertical holes loosely to permit operation of said first mentioned clamping means.

JAMES VAN TASSEL.

REFERENCES CITED

The following references are of record in the file of this patent:

UNITED STATES PATENTS

| Number | Name | Date |
| --- | --- | --- |
| 881,747 | Townsend | Mar. 10, 1908 |
| 1,089,010 | Pugh | Mar. 3, 1914 |

FOREIGN PATENTS

| Number | Country | Date |
| --- | --- | --- |
| 421,921 | Great Britain | Jan. 2, 1935 |